United States Patent
Debras et al.

(10) Patent No.: US 7,169,827 B2
(45) Date of Patent: Jan. 30, 2007

(54) PRODUCTION OF POLYPROPYLENE HAVING IMPROVED PROPERTIES

(75) Inventors: Guy Debras, Frasnes-lez-Gosselies (BE); Marc Dupire, Mons (BE); Jacques Michel, Seneffe (BE)

(73) Assignee: Total Petrochemicals Research Feluy, Feluy (BE)

( * ) Notice: Subject to any disclaimer, the term of this patent is extended or adjusted under 35 U.S.C. 154(b) by 380 days.

(21) Appl. No.: 10/332,160

(22) PCT Filed: Jun. 27, 2001

(86) PCT No.: PCT/EP01/07308
§ 371 (c)(1),
(2), (4) Date: Oct. 17, 2003

(87) PCT Pub. No.: WO02/02654
PCT Pub. Date: Jan. 10, 2002

(65) Prior Publication Data
US 2006/0035996 A1     Feb. 16, 2006

(30) Foreign Application Priority Data
Jul. 5, 2000     (EP) .................... 00202347

(51) Int. Cl.
C08J 3/28     (2006.01)
(52) U.S. Cl. .............. 522/158; 522/113; 522/157; 522/150; 522/160; 522/161
(58) Field of Classification Search ........... 522/157, 522/158, 113, 150, 160, 161
See application file for complete search history.

(56) References Cited

U.S. PATENT DOCUMENTS

| | | | |
|---|---|---|---|
| 4,916,198 A | 4/1990 | Scheve et al. | |
| 5,047,446 A | 9/1991 | DeNicola, Jr. | |
| 5,414,027 A | 5/1995 | DeNicola, Jr. et al. | |
| 5,439,949 A * | 8/1995 | Lucas et al. | 522/157 |
| 5,508,318 A * | 4/1996 | Comer | 522/112 |
| 5,541,236 A | 7/1996 | DeNicola, Jr. et al. | |
| 5,552,104 A * | 9/1996 | DeNicola et al. | 264/456 |
| 5,554,668 A | 9/1996 | Scheve et al. | |
| 5,560,886 A | 10/1996 | Saito et al. | |
| 5,591,785 A | 1/1997 | Scheve et al. | |
| 5,605,936 A | 2/1997 | DeNicola, Jr. et al. | |
| 5,731,362 A | 3/1998 | Scheve et al. | |
| 5,804,304 A | 9/1998 | Williams et al. | |
| 5,820,981 A | 10/1998 | Williams et al. | |
| 5,883,151 A * | 3/1999 | Raetzsch et al. | 522/157 |
| 6,060,533 A * | 5/2000 | Bavaro | 522/157 |
| 6,632,854 B1 * | 10/2003 | Charlier | 522/157 |
| 6,699,919 B1 * | 3/2004 | Charlier | 522/149 |
| 6,774,156 B2 * | 8/2004 | Debras et al. | 522/157 |
| 6,869,982 B2 * | 3/2005 | Dang et al. | 522/112 |
| 2004/0054024 A1 * | 3/2004 | Debras et al. | 522/3 |

FOREIGN PATENT DOCUMENTS

| | | | |
|---|---|---|---|
| EP | 1038893 A1 * | 9/2000 | |
| WO | WO00/56793 | * | 9/2000 |
| WO | WO00/56794 | * | 9/2000 |

* cited by examiner

*Primary Examiner*—Sanza L. McClendon
(74) *Attorney, Agent, or Firm*—William D. Jackson

(57) ABSTRACT

A process for producing polypropylene having increased melt strength, the process comprising irradiating polypropylene which has been polymerised using a Ziegler-Natta catalyst with an electron beam having an energy of at least 5 MeV and a radiation dose of at least 10 kGray and mechanically processing the irradiated polypropylene to form long chain branches on the polypropylene molecules, whereby the polypropylene has a melt flow index (MFI) of at least 25 dg/min.

9 Claims, 6 Drawing Sheets

PRODUCTION OF POLYPROPYLENE HAVING IMPROVED PROPERTIES

The present invention relates to a method for the production of polypropylene, having improved properties, in particular melt strength and high melt index whereby the polypropylene is suitable for the production of fibres. In particular, the present invention relates to a process for the production of polypropylene having improved properties by irradiating polypropylene with a high energy electron beam.

Polypropylene resin is used in a variety of different applications. However, polypropylene resin suffers from the problem of having a low melt strength at high melt index, which restricts the use of polypropylene in a number of applications because the polypropylene is difficult to process, particularly in the production of fibres where high melt index and sufficient melt strength are required. It is known in the art to increase the melt strength of polypropylene, for example by irradiating the polypropylene with an electron beam. It is known that electron beam irradiation significantly modifies the structure of a polypropylene molecule. The irradiation of polypropylene results in chain scission and grafting (or branching) which can occur simultaneously. Up to a certain level of irradiation dose, it is possible to produce from a linear polypropylene molecule having been produced using a Ziegler-Natta catalyst, a modified polymer molecule having free-end long branches, otherwise known as long chain branching.

It is known that such long chain branching drastically modifies the rheological behaviour of the polypropylene, for example their elongational and shear viscosity.

EP-A-0678527 discloses a process for producing a modified polypropylene in which polypropylene and a cross-linking agent mixture are irradiated with ionising radiation so as to give an absorbed dosage of 1 to 20 kGy, with subsequent heat-treating of the resultant material. In Example 1 it is disclosed that the irradiation conditions have an accelerated voltage of 2 MW and an electric current of 1.0 mA.

WO-A-97/08216 discloses a method for producing diene-modified propylene polymers which are irradiated. It is disclosed that the irradiation is preferably carried out using E-beam or γ radiation at a dose of about 1 to about 20 Mrad for a few seconds. It is disclosed that polypropylene made be modified with a diene and then irradiated to cause chain extension.

EP-A-0634441 discloses a process for making a high melt strength propylene polymer by high energy radiation. The dose range is disclosed as being from 1 to 10,000 Mrads per minute and it is disclosed that the ionising radiation should have sufficient energy to penetrate to the extent desired in the mass of linear, propylene polymer material being radiated. There is also disclosed the use of an accelerating potential (for an electron generator) of 500 to 4000 kV. Following the irradiation step the irradiated material is heated.

EP-A-0190889 discloses a process similar to that of EP-A-0634441 in that it is disclosed that the accelerating potential of an electron generator may be from 500 to 4000 kV.

EP-A-0799839 also has a similar disclosure to EP-A-0634441 and discloses the use of an electron generator having accelerating potential of 500 to 4000 kV.

EP-A-0451804 discloses a method of increasing the molecular weight of syndiotactic polypropylene by irradiation in the absense of oxygen. This specification does not disclose any energy range for the irradiation. The dose of the irradiation may be from 0.1 to 50 Mrad. After irradiation, the polypropylene may be heated.

EP-A-0351866 has a yet further similar disclosure to EP-A-0634441 and discloses the use of an electron generator having an accelerating potential of 500 to 4000 kV.

U.S. Pat. No. 5,554,668 discloses a process for irradiating polypropylene to increase the melt strength thereof. An increase in the melt strength is achieved by decreasing the melt flow rate, otherwise known as the melt index. It is disclosed that a linear propylene polymer material is irradiated with high energy ionising radiation, preferably an electron beam, at a dose rate in the range of from about 1 to $1\times10^4$ Mrads per minute for a period of time sufficient for a substantial amount of chain scission of the linear, propylene polymer molecule to occur but insufficient to cause gelation of the material. Thereafter, the material is maintained for a period of time sufficient for a significant amount of long chain branches to form. Finally, the material is treated to deactivate substantially all free radicals present in the irradiated material. It is disclosed that for an electron beam, the electrons are beamed from an electron generator having an accelerating potential (i.e. an energy) of from 500 to 4000 kV. Typically, the polypropylene material to be irradiated is in particulate form and is conveyed on a conveyor belt beneath an electron beam generator which continuously irradiates the polypropylene particles as they are translated thereunder by the conveyor belt. The resultant polyethylene has improved melt strength as represented by a decrease in the melt flow rate. A disadvantage of the process disclosed in U.S. Pat. No. 5,554,668 is that the production rate of the irradiated polypropylene is relatively low, because the speed of the conveyor belt is low and only a small volume of material is processed. This results in difficulties in commercial implementation of the process. In addition, the specification discloses the use of a very broad range of dose rates i.e. from 1 to $1\times10^4$ Mrads per minute. High dose rates of greater than about 40 Mrad can result in a substantially fully cross-linked structure of the polypropylene. Such a cross-linked structure is difficult to process.

EP-A-0520773 discloses an expandable polyolefin resin composition including polypropylene optionally blended with polyethylene. In order to prepare a cross-linked foam, a, sheet of expandable resin composition is irradiated with ionising radiation to cross-link the resin. The ionising radiation may include electron rays, at a dose of from 1 to 20 Mrad. It is disclosed that auxiliary cross-linking agents may be employed which include a bifunctional monomer, exemplified by 1,9-nonanediol dimethyacrylate.

U.S. Pat. No. 2,948,666 and U.S. Pat. No. 5,605,936 disclose processes for producing irradiated polypropylene. The latter specification discloses the production of a high molecular weight, non-linear propylene polymer material characterised by high melt strength by high energy irradiation of a high molecular weight linear propylene polymer. It is disclosed that the ionising radiation for use in the irradiation step may comprise electrons beamed from an electron generator having an accelerating potential of 500 to 4000 kV. For a propylene polymer material without a polymerised diene content, the dose of ionising radiation is from 0.5 to 7 Mrad. For propylene polymer material having a polymerised diene content, the dose is from 0.2 to 2 Mrad.

EP-A-0821018 discloses the preparation of cross linkable olefinic polymers which have been subjected to ionising radiation. The specification exemplifies electron beams of relatively low energy and low doses to split polymeric chains in order to graft silane derivatives onto the polymeric chain. The specification does not address the problem of achieving high melt strength of polymers.

EP-A-0519341 discloses the grafting of vinyl monomers on particulate olefin polymers by irradiating the polymer and treating with a grafting monomer. In an example, polypropylene is irradiated with an electron beam having an energy of 2 MeV and subsequently treated with maleic anhydride as a grafting monomer.

U.S. Pat. No. 5,411,994 discloses the production of graft copolymers of polyolefins in which a mass of olefin polymer particles is irradiated and thereafter the mass is treated with a vinyl. monomer in liquid form. The ionising radiation dose is about 1 to 12 Mrad and the ionising radiation preferably comprises electrons beamed from an electron generator having an accelerating potential of 500 to 4000 kV. The polymer is first irradiated and then treated with a grafting agent.

EP-A-0792905 discloses the continuous production of polypropylene mixtures of increased stress crack resistance and melt strength by the action of ionising radiation. The energy of the ionising radiation is from 150 to 300 keV and the radiation dose ranges from 0.05 to 12 Mrad.

It is further known that when irradiating isotactic polypropylene which has been produced using conventional Ziegler-Natta catalysts, the irradiation of the polypropylene with an electron beam produces free radicals and there is a competition between chain scission and branching which is in favour of chain scission. It is known to use branching agents, for example multi-vinylic compounds, to displace the equilibrium towards the achievement of branching. For example CA-A-2198651 discloses that bifunctional, unsaturated monomers can be added before and/or during the irradiation. Such compounds may include divinyl compounds, alkyl compounds, dienes or mixtures thereof. These bifunctional, unsaturated monomers can be polymerised with the help of free radicals during the irradiation. Butadiene is particularly preferred. CA-A-2198651 also discloses a continuous method for producing polypropylene mixtures of increased stress-crack resistance and melt strength in which a low-energy electron beam accelerator with an energy of from 150 to 300 keV at a radiation dose of 0.05 to 12 Mrads is employed. This process also suffers from the disadvantage that the production rate of the irradiated powder can be somewhat low for commercial acceptance. Moreover, the polypropylene powder to be irradiated must be in the form of very fine particles.

The use of such branching (or grafting) agents leads to the disadvantages of increased cost and increased possibility of environmental problems, in particular toxicity, as a result of adding branching or grafting agent to the polypropylene.

It is also known to irradiate polypropylene copolymers of propylene and dienes, for example 1,5-hexadiene, after their polymerisation. The use of such copolymer complicates substantially the polymerisation procedure.

The present invention aims to provide a process for producing polypropylene resins, having improved properties, in particular improved melt strength and higher melt index, and also optionally which can be manufactured at a high production rate particularly for the manufacture of fibres. It is also an aim of the invention to provide such a process which provides substantially increased long chain branching on the polypropylene molecules following the irradiation, while employing relatively low irradiation doses. It is a further aim to produce polypropylene having higher melt index.

The present invention provides a process for producing polypropylene having increased melt strength, the process comprising irradiating polypropylene which has been polymerised using a Ziegler-Natta catalyst with an electron beam having an energy of at least 5 MeV and a radiation dose of at least 10 kGray and mechanically processing a melt of the irradiated polypropylene to form long chain branches on the polypropylene molecules, whereby the polypropylene has a melt flow index (MFI) of at least 25 dg/min.

The present invention is predicated on the discovery by the present inventor that high irradiation energy electron beams increase the melt index of polypropylene homopolymers produced using a Ziegler-Natta catalyst, without substantially decreasing melt strength. The high energy electron beams also enable high throughput of polypropylene. The polypropylene is irradiated without a branching or grafting agent, because this ensures that branched chains of relatively short length, suitable for the spinning of fibres, are produced. This also makes irradiation more commercially useful and with reduced environmental or toxicity problems.

Preferably, the polypropylene is irradiated at an energy of at least 10 MeV.

The polypropylene may be an isotactic polypropylene, a syndiotactic polypropylene, or a blend of isotactic and syndiotactic polypropylene. Most particularly, the polypropylene has been polymerised using a Ziegler-Natta catalyst, and in particular comprises an isotactic polypropylene polymerised using a Ziegler-Natta catalyst (hereinafter referred to as "ZNiPP"). The polypropylene or polypropylene blend may have a monomodal molecular weight distribution or a multimodal molecular weight distribution, for example a bimodal molecular weight distribution. This production of polypropylene with good melt strength and higher melt index enables the polypropylene to be used in a variety of different applications where high melt flow coupled with melt strength is required where the polymer is processed from the melt, for example in the production of fibres.

The polypropylene may be a homopolymer of propylene or a random or block copolymer of propylene and one or more olefins and/or dienes selected from ethylene and $C_4$ to $C_{10}$ 1-olefins or dienes, which may be linear or branched. For example, the polypropylene may be an ethylene-propylene random copolymer containing up to 10 wt % ethylene. The polypropylene homopolymer may be reinforced by rubber particles, for example ethylene-propylene rubber particles, typically in an amount of up to 30 wt %.

In the irradiation process, typically the polypropylene is deposited onto a continuously moving conveyor such as an endless belt. The polypropylene on the conveyor passes under an electron beam generator which irradiates the polyolefin polypropylene. Preferably, the accelerating potential or energy of the electron beam is from 5 to 100 MeV, still more preferably at least 10 MeV, yet more preferably from 10 to 25 MeV. The power of the electron beam generator is preferably from 50 to 500 kW more preferably for 120 to 250 kW. The radiation dose to which the polypropylene is subjected is preferably from 10 to 100 kGray, preferably around 15 kGray (10 kGray is equivalent to 1 Mrad). The conveyor speed is adjusted in order to achieve the desired dose. Typically, the conveyor speed is from 0.5 to 20 metres/minute, preferably from 1 to 10 metres/minute, more preferably from 2.25 to 8.5 metres/minute.

As a result of the high irradiating potential of the electron beam, not only can the conveyor speed be significantly higher than in the prior art, but also the thickness of the continuously moving bed of polypropylene on the conveyor can be relatively high. Typically, the bed of polypropylene has a thickness of up to 20 cm, most particularly from 5 to 10 cm. The bed of polypropylene on the conveyor typically has a width of up to about 1 metre. Preferably, the irradiation is carried out under an inert atmosphere, such as nitrogen.

After irradiation by the electron beam, the polypropylene powder can be annealed and then treated with at least one known antioxidant additive. The annealing temperature may range from 50 to 150° C. more preferably from 80 to 120° C. and the annealing time may range from 1 to 60 minutes, more preferably from 5 to 30 minutes. Thereafter the polypropylene is mechanically processed, e.g. by extrusion, and granulated.

In accordance with a preferred aspect of the invention, the irradiated polypropylene has increased melt index coupled with good melt strength. This particular combination of rheological properties provides an outstanding processing behaviour which allows the polypropylene based polymers produced in accordance with the invention to be suitable particularly-for producing fibres.

The invention will now be described in greater detail with reference to the following non-limiting examples and the accompanying drawings, in which.

EXAMPLES 1 TO 3 AND COMPARATIVE EXAMPLE 1

In these Examples and Comparative Example, an isotactic polypropylene was produced using a Ziegler-Natta catalyst (thereby producing ZNiPP representing Ziegler-Natta-synthesised isotactic polypropylene). The polymerisation was performed with the addition of hydrogen gas during the polymerisation process. The resultant ZNiPP had a melt flow index (MFI) of around 7 dg/min. In this specification, the melt flow index (MFI) is measured by the procedure of ASTM D 1238 using a load of 2.16 kg at a temperature of 230° C. for polypropylene.

The polypropylene was then subjected to electron beam irradiation. Prior to irradiation, the polypropylene fluff was stabilised with 200 ppm Irganox 1076. In particular, the polypropylene was deposited onto an endless belt conveyor having a speed of 2.2 to 8.8 m/minute. The polypropylene powder was deposited onto the conveyor as a bed having a thickness of 7 cm. The conveyor conveyed the bed under a high energy high power electron accelerator. Such accelerators are available in commerce. The accelerator had an energy of 10 MeV and a power of 120 kW. The polypropylene powder was divided into three samples for Examples 1 to 3 respectively and irradiated for a period of time (determined by the conveyor speed) sufficient to provide varying respective radiation doses of 15, 30 and 60 kGray for Examples 1 to 3. During the irradiation, the powder was maintained under argon (or nitrogen) to exclude oxygen.

After irradiation, the powder was kept under nitrogen and was mixed with conventional antioxidant additives comprising 500 ppm Irganox 3114, 1000 ppm Irgafos 168 and 400 ppm calcium stearate.

After the addition of the antioxidant additives, the powder was extruded and granulated at 220° C. under an argon atmosphere.

The properties of the polypropylene of Examples 1 and 3 and Comparative Example 1 are shown in Table 1.

Figure 1:
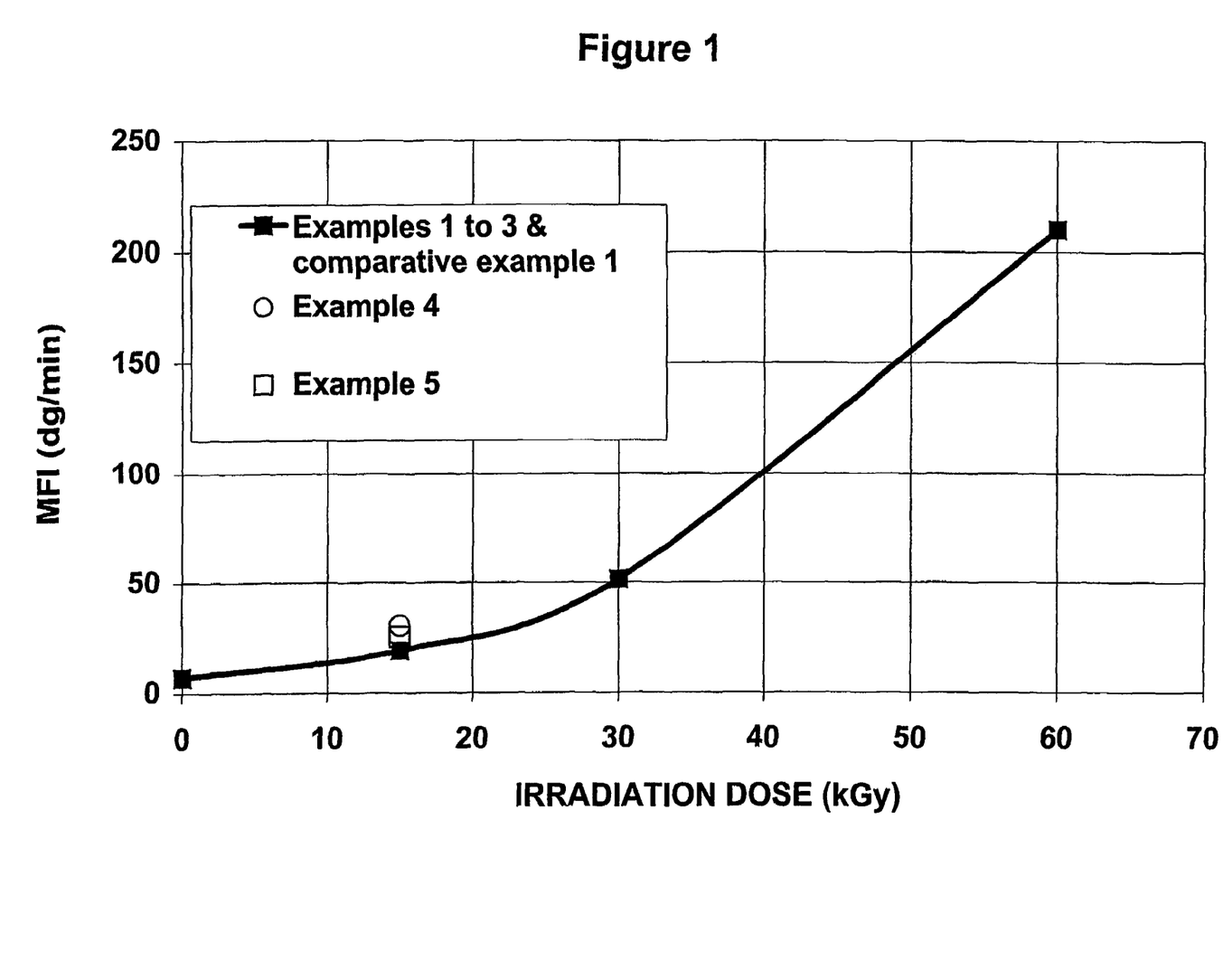
FIG. 1 is a graph showing the relationship between melt flow index (MFI) and irradiation dose for polypropylenes produced in accordance with Examples 1 to 5 of the process of the invention and Comparative Example 1.

The MFI of a sample of the initial non-irradiated ZNiPP of Comparative Example 1 and the three samples of the ZNiPP of Examples 1 to 3 having been irradiated at the three different radiation doses of 15, 30 and 60 kGray were measured and the results are shown in FIG. 1. For Comparative Example 1 there was no irradiation (i.e. a zero irradiation dose). The MFI values for radiation doses of 0, 15, 30 and 60 kGray were, respectively, 6.9, 19.1, 51.3 and 210 g/10 min. For the ZNiPP, it may be seen that the irradiation dose significantly increases the MFI, with progressively increasing MFI for increasing doses. The high MFI values render the irradiated ZNiPP particularly suitable for fibre production. The irradiation dose is selected to achieve the desired properties (e.g. MFI) in the irradiated polymer when starting with a given polymer of particular initial MFI.

Figure 2:
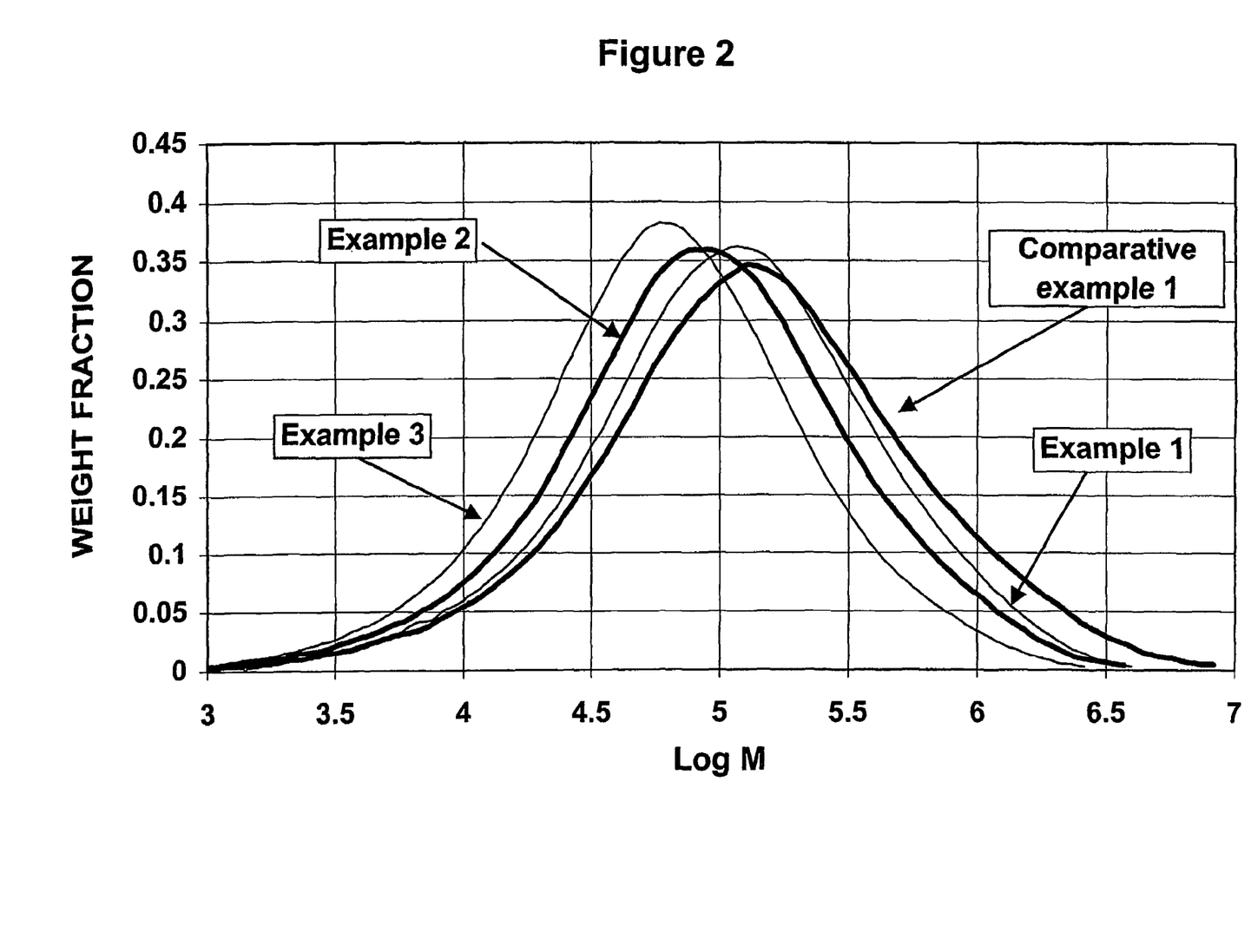
FIG. 2 is a graph showing the molecular distribution of the polypropylenes of Examples 1 to 3 and Comparative Example 1.

In addition, for the four samples, namely the unirradiated sample of Comparative Example 1 and the three irradiated samples of Examples 1 to 3, the molecular weight distribution was determined by gel phase chromatography and the resultant molecular weight distribution curves are shown in FIG. 2.

With increasing irradiation dose, the molecular weight distribution curves are shifted to the lower molecular weight side and the curves become narrower, i.e. with a reduction in the dispersion index D. This means that for ZNiPP, the electron beam irradiation tends to cause more scission of the polymer chains than recombination to form long chain branched polymers. The kinetics of recombination in long branched chains is less important that the scission of the chains. This increase in the formation of shorter chains by scission increases the melt flow of the polymer.

The melt strength of the unirradiated polypropylene of Comparative Example 1 and the irradiated polypropylene of Examples 1 to 3 at the three different irradiation doses was then measured at 210° C. The melt strength was measured using a CEAST rheometer (Rheoscope 1000) equipped with a capillary die and a rotating wheel as a take-up device. Molten polymer was extruded through the capillary drive by application of a pressure resulting from the displacement of a piston. The, molten extrudate was uniaxially stretched before crystallisation by wrapping the fibre around the rotating wheel. In the test, -the piston displacement rate was fixed and the speed of the rotating take-up wheel was lineally changed at constant acceleration until the fibre, becoming very thin, breaks. The tensile force was recorded during the test. The test was run with a cylindrical die having a length/diameter ratio of 5 mm/1 mm. The diameter of the rotating wheel was 120 mm and the displacement rate of the piston was 2 mm/min giving an extrudate throughput of 2.36 mm³/min. The acceleration of the rotating wheel was constant at 10 rpm/100 seconds, or 0.000628m/s². The extrusion temperature was 210° C. During the melt strength experiments, the recorded force rapidly obtained a constant value that remained independent of wheel rpm up to rupture.

The melt strength was defined as the maximum tensile force recorded during the experiment. The melt strength values for each of the four polypropylene samples are shown, with respect to the irradiation dose, in Table 1 and FIG. 3.

Figure 3:
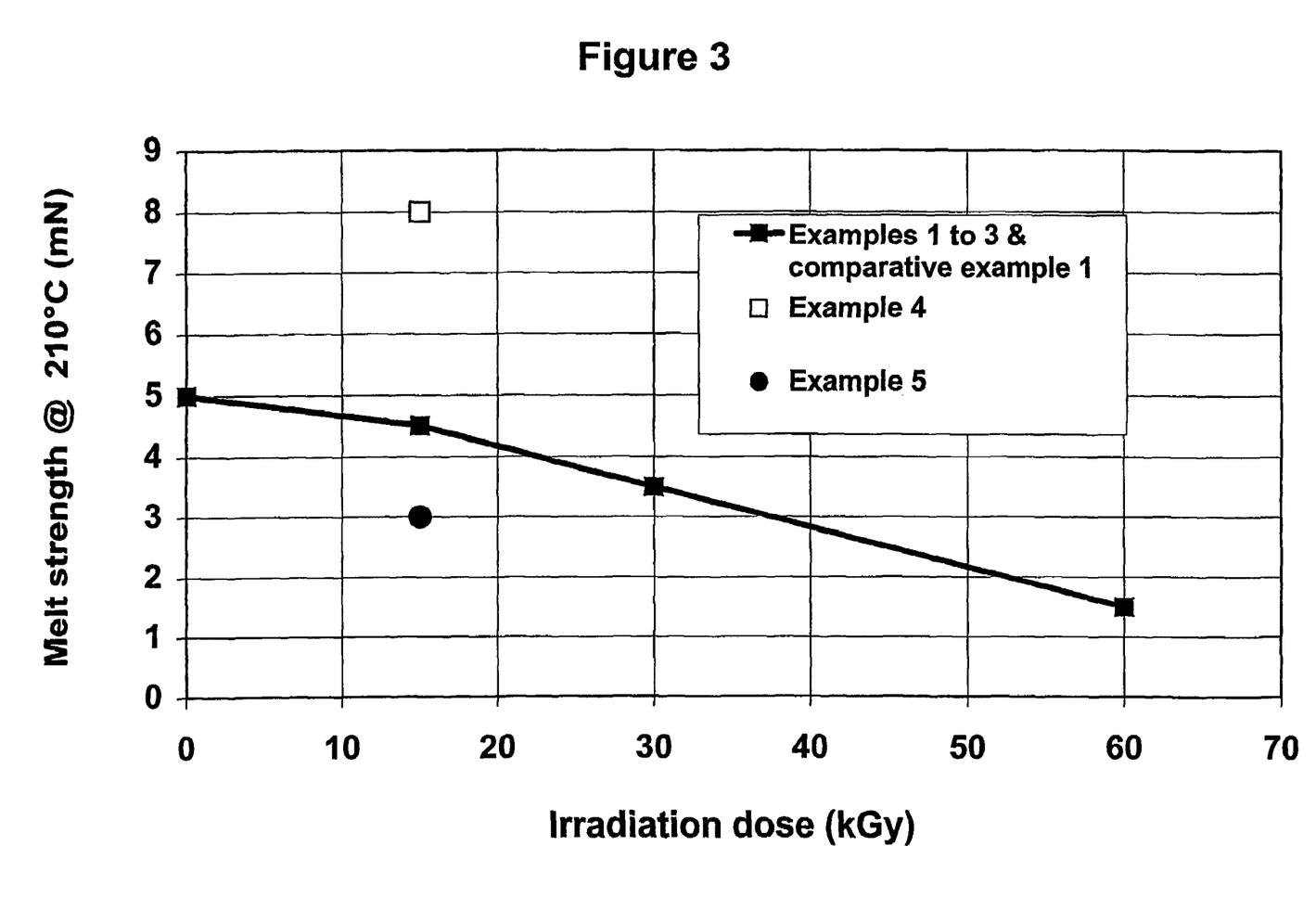
FIG. 3 is a graph showing the relationship between melt strength and irradiation dose for polypropylenes produced in accordance with Examples 1 to 5 and Comparative Example 1.

The relationship between melt strength and irradiation dose is shown in FIG. 3. It will be seen that the melt strength of the ZNiPP decreases slightly with increasing radiation dose. Since the molecular weight of the ZNiPP decreases with increasing irradiation, this causes a decrease of the melt strength, despite any increase in the presence of long chain branching which in turn is indicated by an increase in activation energy (Ea) with irradiation.

The melt strength was correspondingly measured at 250° C. both for Examples 1 to 3 and Comparative Example 1. The results are shown in Table 1. The melt strength decreases slightly with increasing irradiation dose.

The melt strength was also measured at 185° C. with a rotating wheel diameter of 19 cm and with a variable displacement rate of the piston of from 1 to 12 mm/min. The speed of the rotating wheel was adjusted to keep constant the titre of the fibre (10 deniers or 11.1 dTex). The tensile force corresponding to a stretching rate of 3.3 m/s (330 rpm) was defined as the melt strength.

Figure 4:
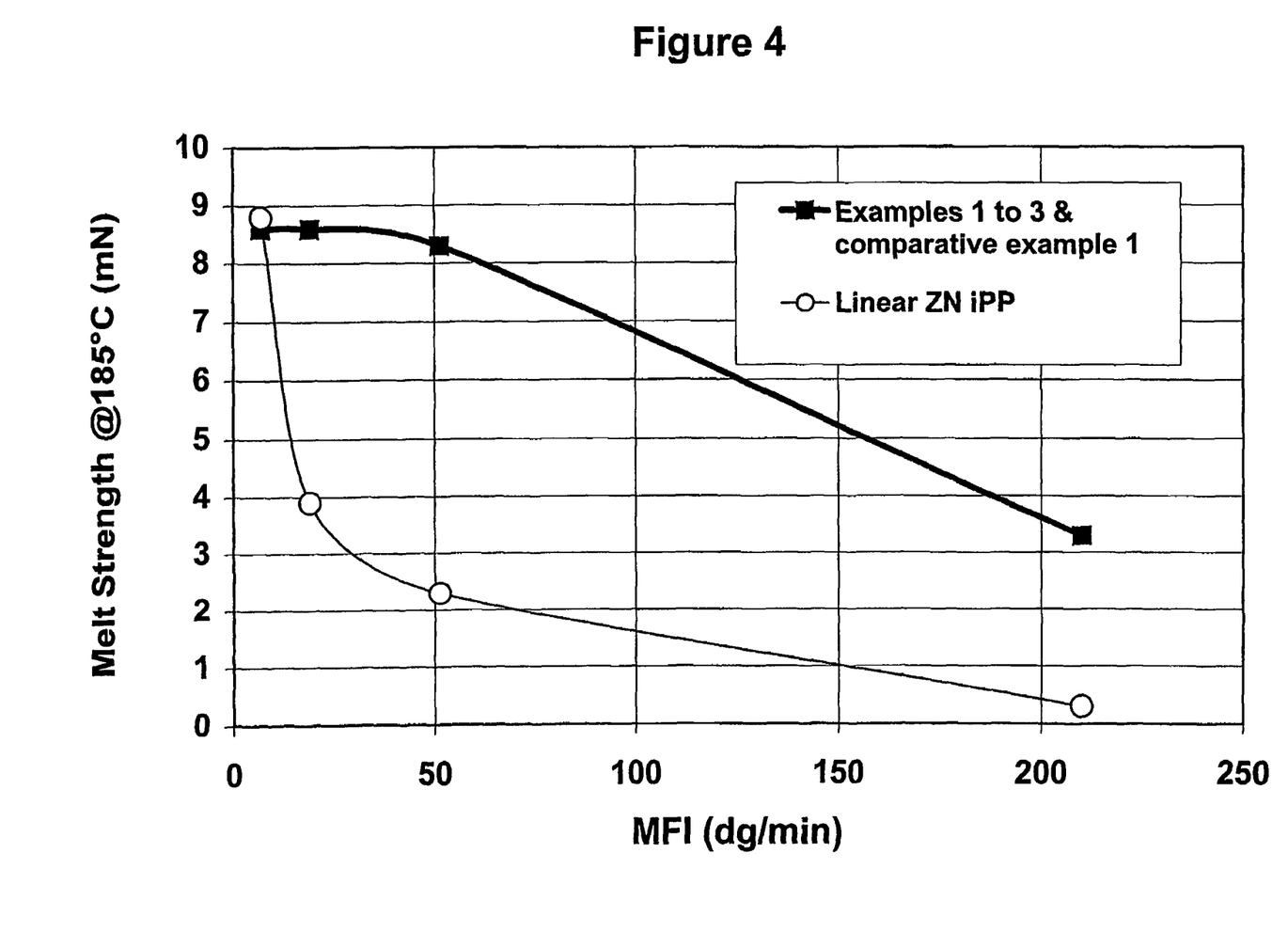
FIG. 4 shows the relationship between melt strength and MFI for the polypropylenes of Examples 1 to 3 and Comparative Example 1 and also linear ZNiPPs having the same molecular characteristics, in particular MFI.

The melt strength of the polypropylenes of Examples 1 to 3 and Comparative Example 1 was measured at 185° C. and the results are shown in Table 1 and FIG. 4. The melt strength for Examples 1 to 3 is the same as or lower than that for Comparative Example 1. In addition, the melt strength for a corresponding number of samples of linear (non irradiated) ZNiPP having varying MFI values substantially the same as those of Examples 1 to 3 and Comparative Example 1 was measured and the results are shown in FIG. 4. At substantially the same MFI values for the linear (non-irradiated) ZNiPP and the irradiated ZNiPP (the same MFI values indicating substantially the same molecular characteristics) the melt strength of the irradiated ZNiPP is higher than that of non-irradiated ZNiPP.

For linear non-irradiated ZNiPP, the melt strength is significantly lower than that of the irradiated ZNiPP of similar MFI and decreases significantly with increasing MFI.

At MFI values greater than about 25 dg/min (achievable for the particular starting MFI of 6.9 dg/min at irradiation doses above about 15 kGray) it may be seen that the melt strength of the irradiated ZNiPP is significantly higher than that of the non-irradiated ZNiPP of corresponding MFI. Thus for such irradiated ZNiPP having an MFI greater than around 25 dg/min, when formed into thin fibres at high fibre spinning speeds yet at relatively low temperatures of around 185° C., a high degree of melt strength is obtained. Thus the irradiated ZNiPP can be spun readily and reliably. The use of irradiation for ZNiPP offsets a rapid decrease in melt strength with increase in MFI, corresponding to a decrease in molecular weight. For the linear non irradiated ZNiPP samples employed in FIG. 4, hydrogen was added to the reactors to achieve a high MFI for the high MFI samples.

It is known that a strong increase of melt viscosity ($\eta$) at low frequency is observed for polypropylene containing long chain branching structures. The relationship between the shear viscosity of the polypropylene melt as a function of circular frequency is dependent upon the degree of long chain branching.

In order to quantify the amount of long chain branching in isotactic polypropylene, the applicant has formulated a parameter, referred to herein as the branching factor g, which is determined from the Theological properties of the polymer. The long chain branching factor g was established by the ratio Mw (COP)/Mw ($\eta 0$) where Mw (COP) is the weight average molecular weight at the crossover point coordinates ($W_c$ and $G_c$) (as discussed hereinbelow) and Mw ($\eta 0$) is the weight average molecular weight at zero shear viscosity. The branching factor is equal to 1±0.05 for linear isotactic polypropylene and is less than 1 for isotactic polypropylene with long chain branching. The branching factor g is determined from the ratio of two weight average molecular weight ($M_w$) values inferred from a dynamic frequency sweep on a viscoelastimeter such as the models available in commerce under the trade names RDA 700 or ARES 700 from the company Rheometrics Scientifics.

The branching factor is determined as follows. For the viscoelastimeter available from Rheometrics Scientifics under the trade name ARES, the operating conditions were set up as follows: the strain was set up to be from 10 to 20%, i.e. in the linear viscoelastic range; the frequency sweep was from 0.1 to 500 radians/second; the plate-plate geometry was 25 mm diameter, with a polymer thickness therebetween of typically around 2 mm. In some instances, the same testing experiment was conducted at different melt temperatures, for example at 190° C. and 210° C., and the viscoelastic responses expressed at the reference temperature of 230° C. using a master curve approach, which is described in the paper entitled "Temperature dependence of polyolefin melt rheology", H. Mavridis and R. N. Shroff, Polymer Eng. Sci. 32, 1778 (1992).

From the data obtained, the storage (G') and loss (G") shear moduli, as well as the complex shear melt viscosity ($\eta^*$) were plotted as a function of circular frequency at the reference temperature of 230° C. A cross-over point (COP) for the storage and loss shear moduli was observed for all the isotactic polypropylenes investigated. The cross-over point (COP) coordinates $G'=G''=G_c$ and the corresponding circular frequency $W_c$ can be used to infer information pertaining to the weight average molecular weight $M_w$ and its polydispersity as first proposed in the paper by G. R. Zeichner and P. D. Patel, Proc. $2^{nd}$ World Cong. Chem. Eng. 6, 333 (1981).

The applicants tested 33 linear isotactic polypropylenes with $M_w$ values ranging from 70 kDa to 1200 kDa and polydispersity index ($D=M_w/M_n$) values of from 2 to 25 and found the following equation for the molecular weight at the cross-over point to apply:

$$M_w(COP)=\exp(6.767-0.187*(LnWc)-0.0129*(LnWc)^2)$$

The weight average molecular weight (Mw) is specified in kDa, and is calculated with a standard deviation estimated to be around 5%.

For the value $M_w$ ($\eta 0$) which is the weight average molecular weight at zero shear viscosity, this is calculated as follows. From the shear viscosity curve, it is possible to extrapolate the viscosity to the zero shear rate viscosity using an equation known as the Carreau-Yasuda equation which is described in the paper entitled "Correlation Between Molecular Structure and Rheological Behaviour of Polypropylene", K. Bernreitner, W. Neissl and M. Gahleitner, Polymer Testing, 11, 89 (1992). As is well known in the literature, a power law relationship exists between $\eta_0$ and $M_w$. Accordingly, using the same data as set out for the cross-over point, the following equation for the weight average molecular weight at zero shear viscosity has been determined:

$$M_w(\eta_0) = \exp(3.5897 + 0.267 * Ln(\eta_0)).$$

The weight average molecular weight $M_w$ is expressed in kDa with a standard deviation around 6%. The viscosity is expressed in Pascal. seconds.

The branching factor g for any given isotactic polypropylene is the ratio between the calculated value and $M_w$ (COP)/$M_w(\eta_0)$.

Figure 5:
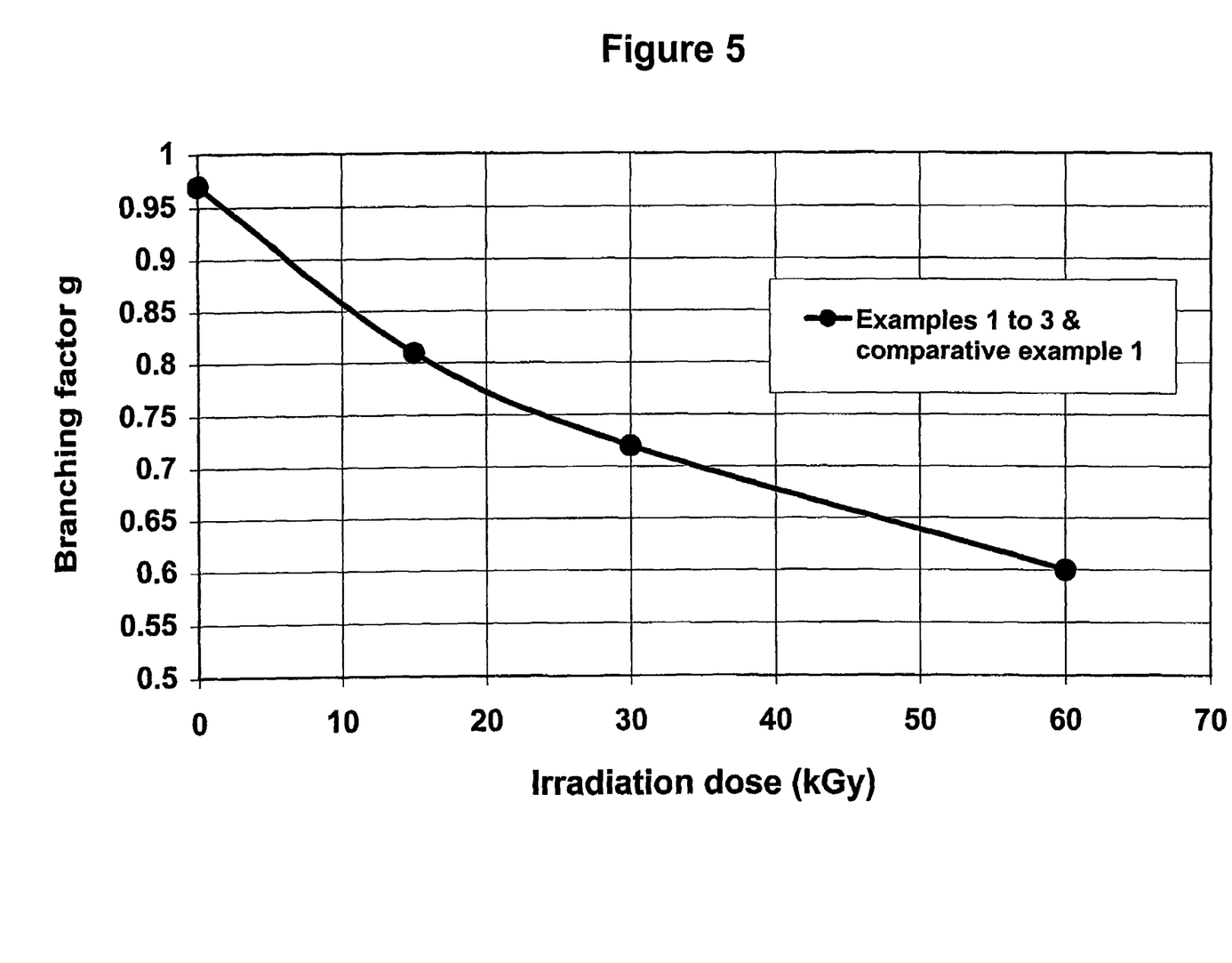
FIG. 5 is a graph showing the relationship between the branching factor g and irradiation dose for the polypropylenes of Examples 1 to 3 and Comparative Example 1.

For the four samples of Examples 1 to 3 and Comparative Example 1, the relationship between the branching factor and the irradiation dose is shown in FIG. 5. The branching factor for the non-irradiated ZNiPP sample of Comparative Example 1 was around 1, indicating linearity. It may be seen that the degree of long chain branch increases, as represented by decreasing branching factor g, with increasing irradiation dose.

Figure 6:
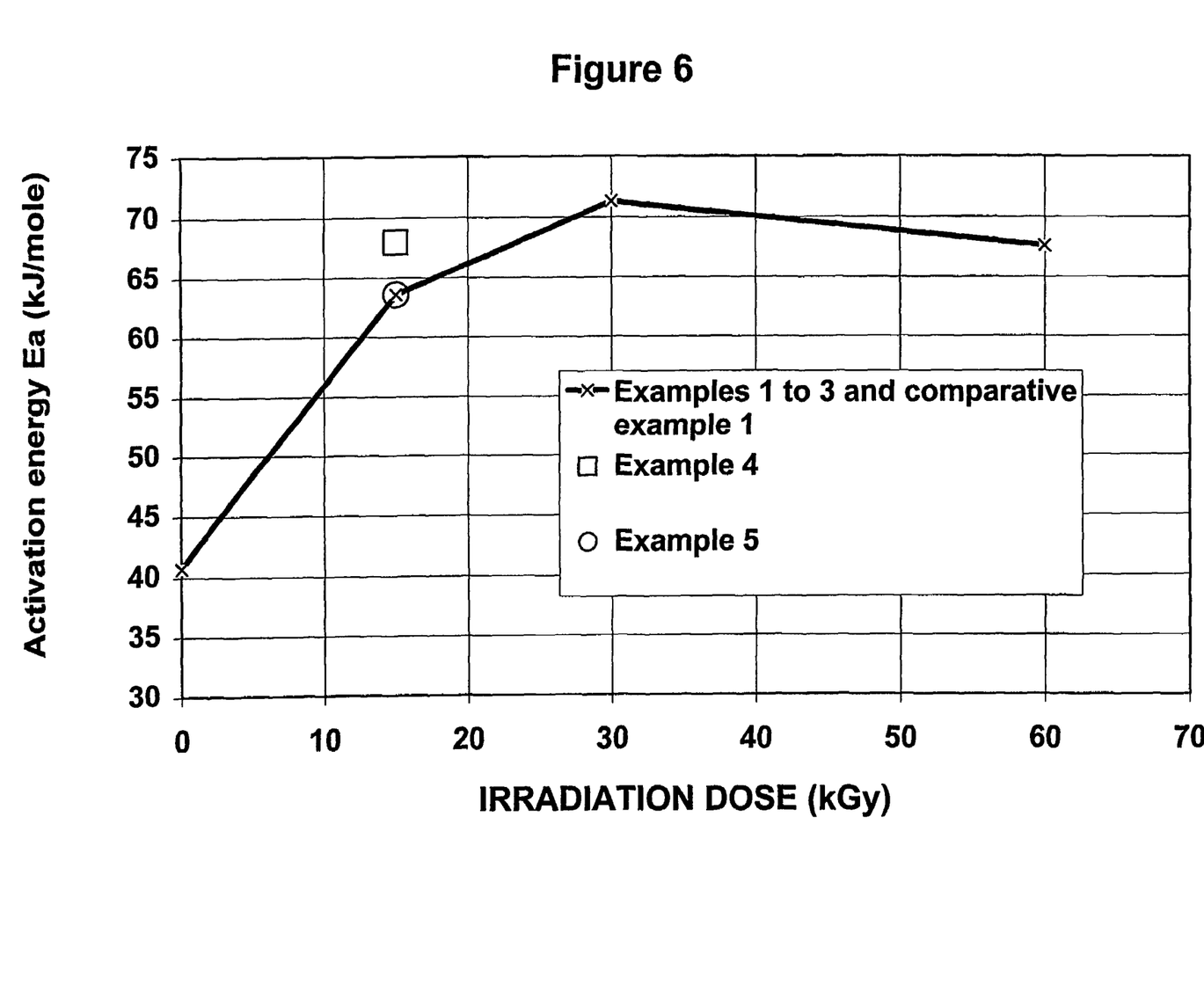
FIG. 6 is a graph showing the relationship between the activation energy and irradiation dose for the polypropylenes of Examples 1 to 5 and Comparative Example 1.

FIG. 6 shows the relationship between activation energy and irradiation dose for Comparative Example 1 and Examples 1 to 3. The activation energy represents the energy necessary to activate the molecule to move in the melt. It may be seen that with increasing irradiation dose, the activation energy increases. This indicates that long chain branching increases with increasing irradiation dose, since this is manifested in the increased activation energy.

For the ZNiPP, a lot of chains were cut by the irradiation, thereby increasing the MFI.

COMPARATIVE EXAMPLES 2 AND 3

For Comparative Examples 2 and 3, linear polypropylenes having a branching factor of 1.0 and MFI values substantially corresponding to the MFI values of Examples 2 and 3 respectively, were tested to determine their molecular weight distributions, melt strength and activation energy and the results are shown in Table 1. It will be seen from a comparison of Comparative Example 2 and Example 2, and from a corresponding comparison of Comparative Example 3 and Example 3, that for linear polypropylenes of substantially the same melt flow properties as an irradiated polypropylene, the melt strength is significantly lower at 185° C. and the activation energy is also significantly lower. It may thus be seen that at equivalent melt flow index when comparing irradiated and non-irradiated polypropylenes, the melt strength and the activation energy are both increased by the irradiation.

The polypropylenes of Examples 1 to 3 were formed into fibres and the tenacity, strain at break and toughness of the fibres were determined for different stretching ratios of the fibres and the results are shown in Table 2. The fibres exhibited good mechanical properties.

COMPARATIVE EXAMPLES 4 TO 6

Linear polypropylenes having substantially the same melt flow index as Examples 1 to 3 for, respectively, Comparative Examples 4 to 6, were formed into fibres and subjected to the same stretching ratios as the fibres of Examples 1 to 3. The results are shown in Table 3. From a comparison of Tables 1 and 3, it may be seen that mechanical properties of the fibres of Examples 1 to 3 are substantially the same or only slightly lower than those of the linear molecules of Comparative Examples 4 to 6. However, as a result of the irradiation process, the melt strength of the polypropylenes of Examples 1 to 3 will have been significantly increased, thereby greatly increasing the processability of the polypropylenes of Examples 1 to 3, particularly when used for the production of fibres.

In Tables 2 and 3, the fibres which were tested were spun on a, Labline spinning machine at a melt temperature of 250° C. with a 40-hole spinneret at a melt throughput of 290 grams per hour. Fibres of 10-dTex (10 grams per 10,000 meters) were produced with nominal stretch ratios (SR) being a ratio of fast to slow godets of from 2 to 4.

Good mechanical properties were obtained with the irradiated samples. The tenacity is slightly decreased as a result of the irradiation, the strain at break increases and the toughness, which is a combination of both factors, is a little bit lower or equivalent at high melt flow indexes.

EXAMPLE 4

For Example 4 the ZNiPP of Example 3 was treated at the same irradiation dose of 60 kGray but the antioxidant additives were 700 ppm Irganox 1010 and 1100 ppm Irgafos 168. The molecular weight distribution, the melt strength and the activation energy were determined for the resultant polymer and the results are shown in Table 1.

The use of an irradiation dose of 60 kGray greatly enhances the MFI of the polymer but to a lesser degree than for Example 3, yet maintains a higher melt strength than for Example 3, the melt strength being substantially the same at 185° C. and 250° C. as for the unirradiated polymer. The activation energy of Examples 3 and 4 is about the same, indicating a similar degree of long chain branching.

TABLE 1

| Polymer | ZNiPP | | | | | | |
|---|---|---|---|---|---|---|---|
| | Comp. Example 1 | Example 1 | Example 2 | Example 3 | Comp. Example 2 | Comp. Example 3 | Example 4 |
| Irradiation dose(kGray) | 0 | 15 | 30 | 60 | 0 | 0 | 60 |
| MFI (dg/min) | 6.9 | 19.1 | 51.3 | 210 | 51.3 | 190 | 93 |
| Mn (kDa) | 48.2 | 45.8 | 37 | 29.5 | 27.1 | 22.1 | 33.2 |
| Mw (kDa) | 297 | 211 | 176 | 122 | 171 | 108 | 167 |
| Mz (kDa) | 1347 | 687 | 628 | 423 | 764 | 379 | 654 |
| D | 6.2 | 4.6 | 4.8 | 4.1 | 6.34 | 4.9 | 5 |
| D' | 4.5 | 3.2 | 3.6 | 3.5 | 4.5 | 3.5 | 3.9 |
| Branching factor g | 0.97 | 0.81 | 0.72 | 0.6 | 1.0 | 1.0 | — |

TABLE 1-continued

| | ZNiPP | | | | | | |
|---|---|---|---|---|---|---|---|
| Polymer | Comp. Example 1 | Example 1 | Example 2 | Example 3 | Comp. Example 2 | Comp. Example 3 | Example 4 |
| Melt Strength @ 185° C. (mN) | 8.6 | 8.6 | 8.3 | 3.3 | 3.2 | 0 | 8 |
| Melt Strength @ 210° C. (mN) | 5 | 4.5 | 3.5 | 1.5 | — | — | 4 |
| Melt Strength @ 250° C. (mN) | 3.5 | 2.5 | 2 | 0 | — | — | 2 |
| Ea (kJ/mole) | 40.7 | 63.6 | 71.3 | 67.6 | 39 | 38 | 67.6 |

TABLE 2 irradiated molecules

| | Example 1 | | Example 2 | | Example 3 | | |
|---|---|---|---|---|---|---|---|
| | MFI (dg/min) | | | | | | |
| | 19.1 Stretching ratio | | 51.3 Stretching ratio | | 210 Stretching ratio | | |
| | 2 | 3 | 2 | 2.5 | 2 | 3 | 4 |
| Tenacity T (cN/dTex) | 2.4 | 3.3 | 1.8 | 1.7 | 1.5 | 1.7 | 1.8 |
| Strain at break E(%) | 210 | 92 | 232 | 268 | 319 | 207 | 95 |
| Toughness = T√E | 35.1 | 31.6 | 26.9 | 27.0 | 26.6 | 25.0 | 17.2 |

TABLE 3 linear molecules

| | Comp. Example 4 | | Comp. Example 5 | | Comp. Example 6 | | |
|---|---|---|---|---|---|---|---|
| | MFI (dg/min) | | | | | | |
| | 21 Stretching ratio | | 48 Stretching ratio | | 201 Stretching ratio | | |
| | 2 | 3 | 2 | 2.5 | 2 | 3 | 4 |
| Tenacity T (cN/dTex) | 3.8 | 4.9 | 2.4 | 2.4 | 1.8 | 2.5 | 3.1 |
| Strain at break E(%) | 138 | 81 | 180 | 187 | 219 | 111 | 71 |
| Toughness = T√E | 44.8 | 44.0 | 32.1 | 27.0 | 26.0 | 26.7 | 26.3 |

The invention claimed is:

1. A process for producing a propylene polymer having increased melt strength, the process comprising irradiating a propylene polymer which has been polymerized using a Ziegler-Natta catalyst with an electron beam having an energy of at least 5 MeV and a radiation dose of at least 10 kGray and mechanically processing a melt of the irradiated propylene polymer to form long chain branches on the propylene polymer molecules, whereby the irradiated propylene polymer has a melt flow index (MFI) of at least 25 dg/min.

2. A process according to claim 1 wherein the electron beam has an energy of at least 10 MeV.

3. A process according to claim 1 wherein the electron beam has an energy within the range of 10–25 MeV.

4. A process according to claim 1 wherein the power of the electron beam is from 50 to 500 kW.

5. A process according to claim 1 wherein the power of the electron beam is from 120–250 kW.

6. A process according to claim 1 wherein the radiation dose is within the range of 10–60 kGray.

7. A process according to claim 1 wherein said propylene polymer is a polypropylene homopolymer.

8. A method of claim 1 wherein said pro;ylene polymer is a copolymer of propylene and at least one alpha olefin selected from a group consisting of ethylene and $C_4$–$C_{10}$ 1-olefins.

9. A process accorded to claim 1 wherein said propylene polymer is isotactic polypropylene.

* * * * *